United States Patent [19]
Trompower et al.

[11] Patent Number: 6,052,408
[45] Date of Patent: Apr. 18, 2000

[54] CELLULAR COMMUNICATION SYSTEM WITH DYNAMICALLY MODIFIED DATA TRANSMISSION PARAMETERS

[75] Inventors: Michael L. Trompower, Navarre, Ohio; Paul F. Struhsaker, Plano, Tex.

[73] Assignee: Aironet Wireless Communications, Inc., Fairlawn, Ohio

[21] Appl. No.: 08/866,342

[22] Filed: May 30, 1997

Related U.S. Application Data

[62] Division of application No. 08/523,942, Sep. 6, 1995, abandoned.

[51] Int. Cl.[7] ................................................. H04B 15/00
[52] U.S. Cl. ............................................. 375/206; 375/208
[58] Field of Search .................................... 370/335, 342; 375/200, 206, 208; 342/357

[56] References Cited

U.S. PATENT DOCUMENTS

| | | |
|---|---|---|
| 4,041,391 | 8/1977 | Deerkoski . |
| 4,456,793 | 6/1984 | Baker et al. ............................ 379/56.3 |
| 4,665,404 | 5/1987 | Christy et al. . |
| 4,672,658 | 6/1987 | Kavehrad et al. . |
| 4,856,046 | 8/1989 | Streck et al. ............................ 379/56.3 |
| 4,907,224 | 3/1990 | Scoles et al. . |
| 4,930,140 | 5/1990 | Cripps et al. . |
| 5,025,486 | 6/1991 | Klughart . |
| 5,042,050 | 8/1991 | Owen et al. . |
| 5,164,958 | 11/1992 | Omura . |
| 5,177,766 | 1/1993 | Holland et al. . |
| 5,204,876 | 4/1993 | Bruckert et al. . |
| 5,223,923 | 6/1993 | Morales-Garza .......................... 348/12 |
| 5,241,410 | 8/1993 | Streck et al. ............................. 378/176 |
| 5,258,867 | 11/1993 | Iggulden et al. .......................... 359/159 |
| 5,267,244 | 11/1993 | Messerchmitt et al. ................ 370/95.3 |
| 5,291,516 | 3/1994 | Dixon et al. . |
| 5,321,721 | 6/1994 | Yamaura et al. . |
| 5,327,580 | 7/1994 | Vignali et al. .......................... 455/35.1 |
| 5,335,249 | 8/1994 | Krueger et al. . |
| 5,341,396 | 8/1994 | Higgins et al. . |
| 5,353,300 | 10/1994 | Lee et al. . |
| 5,363,404 | 11/1994 | Kotzin et al. . |
| 5,377,256 | 12/1994 | Franklin et al. . |
| 5,425,051 | 6/1995 | Mahany . |
| 5,442,625 | 8/1995 | Giltin et al. .............................. 370/18 |
| 5,450,616 | 9/1995 | Rom . |
| 5,493,436 | 2/1996 | Karasawa et al. ....................... 379/145 |
| 5,509,050 | 4/1996 | Berland . |
| 5,511,073 | 4/1996 | Padovani et al. . |
| 5,565,982 | 10/1996 | Lee et al. ................................. 356/317 |
| 5,574,771 | 11/1996 | Driessen et al. . |
| 5,614,914 | 3/1997 | Bolgiano et al. . |
| 5,673,260 | 9/1997 | Umeda et al. ............................ 370/342 |
| 5,687,166 | 11/1997 | Natali et al. . |
| 5,689,524 | 11/1997 | Takaki et al. ............................ 375/200 |
| 5,694,417 | 12/1997 | Andren et al. ........................... 375/206 |
| 5,715,236 | 2/1998 | Gilhousen et al. ...................... 370/209 |
| 5,724,665 | 3/1998 | Abassi et al. ............................ 455/461 |
| 5,802,173 | 9/1998 | Hamilton-Piercy et al. .......... 379/56.2 |

FOREIGN PATENT DOCUMENTS

| | | |
|---|---|---|
| 0579372A2 | 1/1994 | European Pat. Off. . |
| 0622911A2 | 11/1994 | European Pat. Off. . |

*Primary Examiner*—Stephen Chin
*Assistant Examiner*—Joseph Roundtree
*Attorney, Agent, or Firm*—Arter & Hadden LLP

[57] ABSTRACT

An apparatus and process for improving the performance of a cellular communication system using direct sequence spread spectrum techniques is disclosed. The apparatus and process enable dynamic modification of communication system parameters including PN code length, chipping rate and modulation technique for transmission of a data packet. Modification is based on proximity of the transmitter and receiver, noise level, transmitter and receiver capabilities and other factors. The system makes tradeoffs between data transmission speed and communication range to improve system performance.

11 Claims, 8 Drawing Sheets

CELLULAR COMMUNICATION SYSTEM WITH DYNAMICALLY MODIFIED DATA TRANSMISSION PARAMETERS

CROSS-REFERENCE TO RELATED APPLICATION

This is a division of application Ser. No. 08/523,942, filed Sep. 6, 1995 now abandoned.

TECHNICAL FIELD

This invention relates generally to the field of wireless data communication systems and, in particular, to a direct sequence spread spectrum cellular communication system which dynamically modifies data transmission parameters to enhance system performance.

BACKGROUND

In recent years, the use of cellular communication systems having mobile terminals which communicate with a hardwired network, such as a local area network (LAN), has become widespread. Retail stores and warehouses, for example, may use cellular communications systems to track inventory and replenish stock. In manufacturing facilities, such systems are useful for tracking parts, completed products and defects.

A typical cellular communication system includes a number of fixed base stations interconnected by a cable medium to form a hardwired network. The hardwired network is often referred to as a system backbone. Associated with each base station is a geographic cell. A cell is a geographic area in which a base station has sufficient signal strength to transmit data to and receive data from a mobile terminal with an "acceptable" error rate. The error rate for transmitted data is defined as the ratio of the number of transmitted data bits received in error to the total number of bits transmitted. It is economically inefficient to design a communications system with a "zero" error rate. Rather, depending on the requirements of users of the system, an "acceptable" error rate is determined. For example, an "acceptable" error rate may be set at a maximum error correcting rate capability of an error correcting code utilized by the system. The cell associated with a base station is a geographic area in which the station can transmit and receive data with an error rate at or below the "acceptable" error rate. In many instances, the cell of a base station is not circular because physical structures within the cell may partially block data signals emanating from the base station thereby creating "dead spots" which cannot receive transmissions from the station at or below the "acceptable" error rate. The cell size may be decreased by machinery located in the vicinity of the base station which generates excessive noise levels that degrade a signal transmitted by the base station. Undesirable signals that interfere with the transmission and reception of a transmitted signal are collectively referred to as noise signals. A useful quantitative measure of relative noise in a communication system is the signal-to-noise ratio (SNR). The SNR is the ratio of the amplitude of a desired signal at any point to the amplitude of noise signals at that same point.

Mobile terminals, such as hand-held units or portable units mounted in a vehicle, may communicate with other devices on the network via wireless communication links through one or more of the base stations. Generally, when a mobile terminal is powered up, it "registers" with a base station which provides the strongest SNR. However, as the location of this mobile terminal changes, it may "de-register" with the first base station and register with another base station which provides a stronger SNR.

When designing a cellular communication system for a region, an appropriate number of base stations must be selected and their locations determined to assure cell coverage for the region. Each additional base station increases the cost of the communication system by the incremental cost of the base station and the cable medium to link the additional base station to the backbone. Because the conditions of the region may result in "dead spots" in a base station's cell and since the cost of a base station increases with the transmission power of the station, it is generally not feasible to provide one high-powered base station to service the entire region. In addition, the limited power supply of a wireless mobile terminal provides for a limited communication range. Also, FCC regulations limit the transmission power of transmitters. Thus, the design of a cellular communication system involves consideration of a complex set of variables including the conditions of the region, transmitted power and cost of base stations, time and spatial patterns of system usage, sources of noise, "acceptable" error rate or rates, etc.

A spread spectrum (SS) communication system is one in which the transmitted frequency spectrum or bandwidth is much wider than absolutely necessary. Wideband frequency modulation (FM) is an example of an analog SS communication system. With regard to a digital SS communication system, the transmission bandwidth required by the baseband modulation of a digital signal is expanded to a wider bandwidth by using a much faster switching rate than used to represent the original bit period. Operationally, prior to transmission, each original data bit to be transmitted is converted or coded to a sequence of "sub bits" often referred to as "chips" (having values of zero or one) in accordance with a conversion algorithm. The coding algorithm is usually termed a spreading function. Depending on the spreading function, the original data bit may be converted to a sequence of five, ten, or more chips. The rate of transmission of chips by a transmitter is defined as the "chipping rate".

A SS communication system transmits chips using a wider signal bandwidth (broadband signal) and a lower signal amplitude then the corresponding original data would have been transmitted at baseband. At the receiver, a despreading function and a demodulator are employed to convert or decode the transmitted chip code sequence back to the original data on baseband. The receiver, of course, must receive the broadband signal at the transmitter chipping rate.

An advantage of a SS communication system is that the representation and communication of an original data bit as a sequence of chips over a wide bandwidth in lieu of transmitting the original data bit over a narrow bandwidth generally results in a lower error rate at the receiver. This is especially true in transmission environments characterized by noise having high amplitude and short duration, i.e., "spike" noise. The probability of a receiver extracting and correctly interpreting a data bit represented by a transmitted sequence of chips interspersed with random, uncorrelated noise spikes is greater than the probability of the receiver extracting and correctly interpreting a transmission of single bits interspersed with such random noise spikes.

In essence, a SS communication system utilizes increased bandwidth and a coding scheme to reduce error rate vis-a-vis a "conventional" baseband system. The reduction in error rate results in an improved output SNR at the receiver. For any communication system, the difference between output SNR and input SNR is defined as the processing gain of the system. In a SS communication system, the processing gain of the system is the ratio of the transmission code rate to the original information bit rate. For example, assume that the SS coding scheme utilizes a sequence of ten chips to represent one original data bit. If the ten chips are transmitted at a chipping rate such that their collective duration is equal to a single bit period at baseband, then the processing gain of the SS system is approximately equal to ten. Communication range is determined by a fully processed SNR at a receiver. The fully processed S/N is the processing gain associated with SS communication techniques combined with the received signal strength.

The coding scheme of a SS digital communication system utilizes a pseduo-random binary sequence (PRSB). One type of a digital SS communication system is known as a direct sequence spread spectrum (DSSS) system. In a DSSS system, coding is achieved by converting each original data bit (zero or one) to a predetermined repetitive pseudo noise (PN) code. A type of PN code is illustrated in FIG. 1. For this example, the digital data signal 110 is made up of a binary "1" bit and a "0" bit. A PN code 120 is comprised of a sequence of ten sub bits or chips, namely, "1", "0", "1", "1", "0", "1", "1", "1", "0", "1".

The digital data signal 110 is coded or spread by modulo 2 multiplying (e.g., via an "EXCLUSIVE NOR" (XNOR) function) of the digital data signal 110 with the PN code 120. If the data bit is a "1", then the resulting spread data signal (PN coded signal) in digital form corresponds to the PN code 120. However, if the data bit to be coded is a "0", then the spread data signal in digital form will correspond to a code 130. As can be seen, the code 130 is the inverse of PN code 120. That is, the PN code and its inverse are used to represent data bits "1" and "0" respectively.

A PN coded length refers to a length of the coded sequence (the number of chips) for each original data bit. As noted above, the PN code length affects the processing gain. A longer PN code yields a higher processing gain which results in an increased communication range. The PN code chipping rate refers to the rate at which the chips are transmitted by a transmitter system. A receiver system must receive, demodulate and despread the PN coded chip sequence at the chipping rate utilized by the transmitter system. At a higher chipping rate, the receiver system is allotted a smaller amount of time to receive, demodulate and despread the chip sequence. As the chipping rate increases so to will the error rate. Thus, a higher chipping rate effectively reduces communication range. Conversely, decreasing the chipping rate increases communication range.

The spreading of a digital data signal by the PN code does not effect to overall signal strength (or power) the data being transmitted or received. However, by spreading a signal, the amplitude at any one point will be less then the original (non-spread) signal.

It should be appreciated that increasing the PN code length or decreasing the chipping rate to achieve a longer communication range will result in a slower data transmission rate. Correspondingly, decreasing the PN code length or increasing the chipping rate will increase data transmission rate at a price of reducing communication range.

FIG. 1A schematically illustrates a transmitter system or assembly 100 of a DSSS system. Original data bits 101 are input to the transmitter system 100. The transmitter system includes a modulator 102, a spreading function 104 and a transmit filter 106. The spreading function 104 converts the modulated original data bits 101 into a PN coded chip sequence 108, also referred to as spread data. The modulator 102 modulates the data onto a carrier using, for example, a binary phase shift keying (BPSK) modulation technique. The BPSK modulation technique involves transmitting the carrier in-phase with the oscillations of an oscillator or 180 degrees out-of-phase with the oscillator depending on whether the transmitted bit is a "0" or a "1".

FIG. 1A also illustrates a receiver system or assembly, shown generally at 150. The receiver system 150 includes a receive filter 152, a despreading function 154, a bandpass filter 156 and a demodulator 158. The received PN coded data 108 is decoded by a PN code despreading function 154. The decoded data is then filtered and demodulated by the filter 156 and the demodulator 158 respectively to reconstitute the original data bits 101. To receive the transmitted spread data, the receiver system 150 must be tuned to the same predetermined carrier frequency and be set to demodulate a BPSK signal using the same predetermined PN code.

To receive a SS transmission signal, the receiver system must be tuned to the same frequency as the transmitter assembly to receive the data. Furthermore, the receiver assembly must use a demodulation technique which corresponds to the particular modulation technique used by the transmitter assembly (i.e. same PN code length, same chipping rate, BPSK). Because mobile terminals communicate with a common base station, each device in the cellular network must use the same carrier frequency and modulation technique.

A drawback associated with current cellular communication systems is that a PN code length must be selected to provide performance based on average communication range and average noise conditions. The data rate/range tradeoff leads to a cell size/throughput tradeoff in the communication system. The rate that each transmission occurs at will limit the size of each cell. Thus, it would be desirable to have a cellular communication system wherein processing gain and/or chipping rate could be dynamically modified for each transmission based on distance between the transmitter and receiver and noise conditions such that an optimal data transmission rate for that transmission could be achieved thereby enhancing system performance.

SUMMARY OF THE INVENTION

The present invention includes an apparatus and a process for enhancing the performance capabilities of a cellular communication system utilizing DSSS techniques. The cellular communication system of the present invention includes a plurality of mobile terminals and a plurality of base stations. The base stations are linked via a hardwired network backbone. Each base station can transmit and receive data in its respective cell. For a given communication between a mobile terminal and a base station, the mobile terminal and the base station can adjust the PN code length and the chipping rate depending on communication conditions to maximize the transmission rate while retaining an "acceptable" error rate. Moreover, the system also provides that system components can adjust other cellular communication system parameters such as modulation schemes and transmitter power levels in conjunction with PN code adjustments to further enhance the performance capabilities of the system.

Each base station and mobile terminal of the cellular communication system or network of the present invention includes a transmitter system and receiver system. Moreover, each transmitter system and receiver system is capable of, respectively, transmitting or receiving PN coded signals formed with PN codes having varying code lengths and chipping rates. Accordingly, as the conditions of the wireless communication link between the base station and mobile terminal change, the present invention advantageously may adjust the PN code values to obtain the best data rate possible for the current range and noise conditions thereby optimizing the performance capabilities of the cellular communication system as a whole.

In a first illustrative example, when a mobile terminal and a base station are located in relatively close proximity to each other, the present invention may select and utilize a short PN code length (e.g. five chips per original data bit) this will result in a relatively fast data transmission rate. The short PN code length will result in a relatively low processing gain and a corresponding decreased communication range. However, because the base station and mobile terminal are close, the decreased communication range does not significantly increase the error rate. If the mobile terminal moves away from the base station such that the terminal is outside a communication range or cell when communicating using the short PN code length, the cellular communication system of the present invention recognizes the changing condition and the base station and mobile terminal suitably increase the PN code length (e.g., to ten chips per original data bit) to provide for a higher processing gain and thereby greater communications range. The greater processing gain afforded by the longer PN code length reduces the data transmission rate. Despite the slower transmission rate between the mobile station terminal and the base station, the overall exchange of data between this base station and all other mobile terminals will not be effected unless this base station is operating close to full capacity. Therefore, in most instances, the reduced transmission rate between that one specific mobile terminal and one specific base station should have little effect on the communication system as a whole.

On the other hand, when a mobile terminal and a base station are in need of a fast data transmission rate and condition otherwise permit, the present invention may select to use a PN code having a relatively rapid chipping rate value (e.g. 22 MHz). If the spectral bandwidth needs to be decreased due to, among other reasons, excessive noise on closely situated frequency bands, the present invention may decrease the chipping rate (e.g. to 11 MHz) to decrease the required transmission bandwidth. In this case, the data transmission rate is reduced commensurate with the narrower bandwidth.

In a second embodiment of this invention, each base station and mobile terminal of a cellular communication system or network may not be capable of varying chipping rates and PN code lengths. Therefore, a cellular network is provided in which PN code values are dynamically modified based on the capabilities of the transmitter and receiver.

For example, a base station capable of dynamically varying PN code values may be communicating with a closely positioned mobile terminal which transmits and receives data only at a single, predetermined PN code length and rate. Although a shorter PN code length could be selected based on the close range, the mobile terminal is incapable of supporting the shorter code. Therefore, the code supported by the mobile terminal is utilized. In another aspect of the present invention, additional system modulation parameters may be altered by system components to optimize the data transmission rate/range tradeoff for each communication. For example, in a situation where a high data transmission rate is required, a base station may select to use a high order modulation scheme, for example, 16 QAM, 32 QAM, etc. In a situation where an increased cell size, lower transmitter power and/or a lower data error rate is required, the base station may select a lower order modulation scheme (e.g., BPSK, QPSK, etc.).

In yet another aspect of the present invention, transmission power is also selectable by system components. Thus, in a situation where a strong PN coded signal is necessitated because the mobile terminal is relatively distant from the base station, the present invention may select to use a high power level to transmit the PN coded signal. Conversely, if the battery of a mobile terminal is running low, the present invention may select a lower power level to transmit the PN coded signal in order to conserve the battery's energy. Also, where the mobile terminal is located in very close proximity to the base station, the present invention may select to use an even lower power level to transmit the PN coded signals back and forth between the communication devices so that the receivers of each device are not saturated.

Finally, in yet a further aspect of the present invention, the system components may also select to transmit and receive PN coded signals using a variety of antennas having different gain and directivity characteristics. For example, where a base station is positioned in the center of a cell, the present invention may select to use an omni directional antenna so that the base station may transmit and receive signals in all directions. In another example, where a base station is to communicate a longer distance, the present invention may select to use a yagi directional antenna so that the base station may transmit a signal with a higher gain.

The aforementioned and other aspects of the present invention are described in more detail in the detailed description and accompanying drawings which follow.

DETAILED DESCRIPTION OF THE INVENTION

Figure 1:
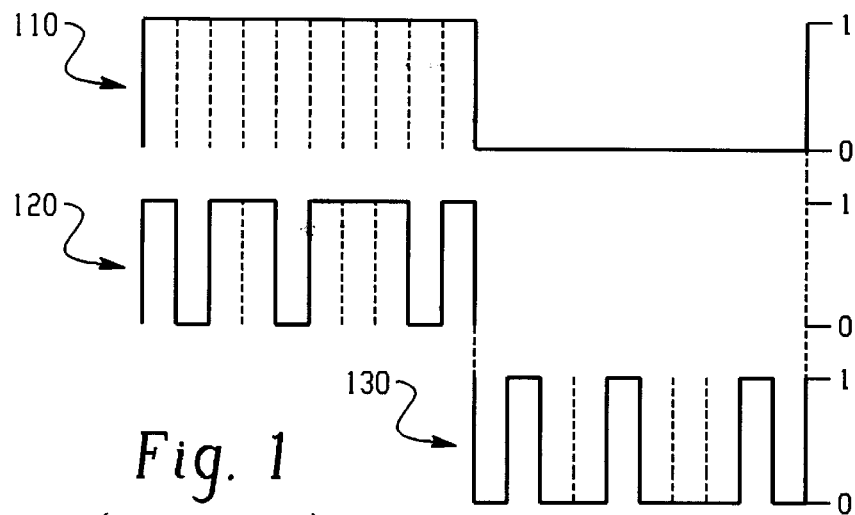
FIG. 1 is a schematic representation of a PN coded signal for data bits "0" and "1"
Figure 1A:
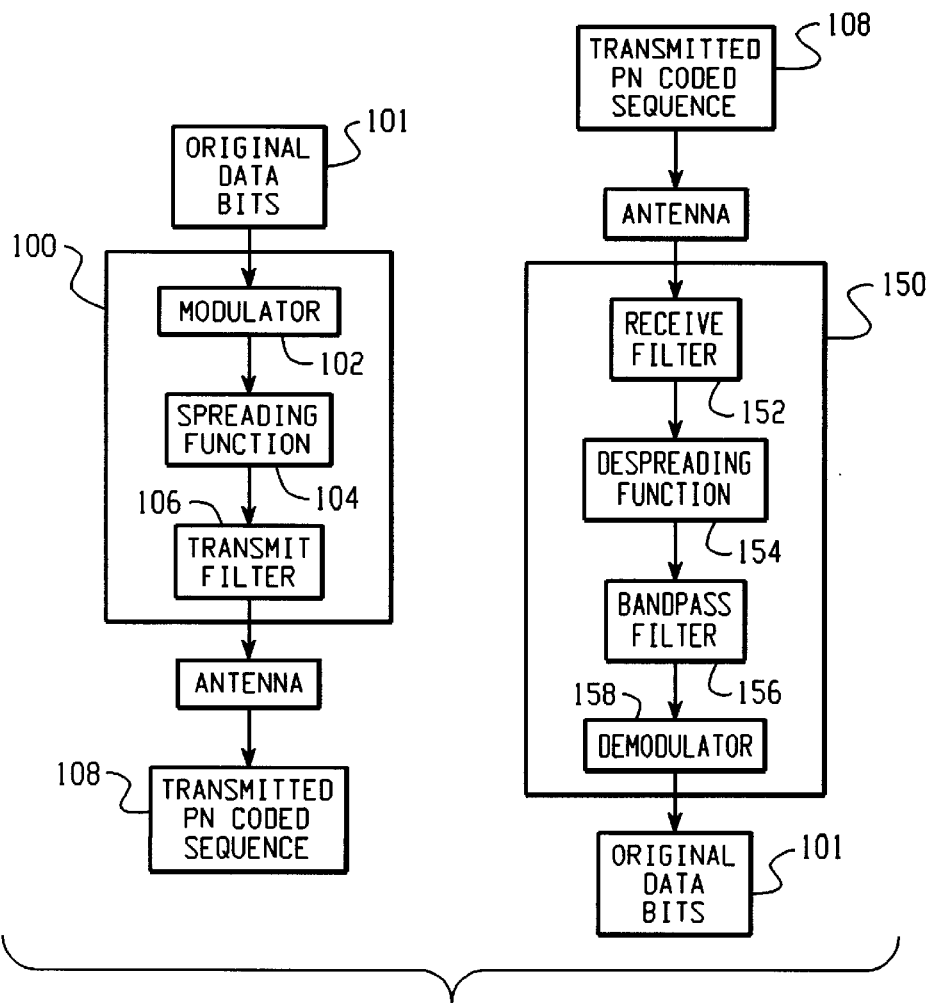
FIG. 1A is a schematic representation of a transmitter system and a receiver system of a DSSS communication system.
Figure 2:
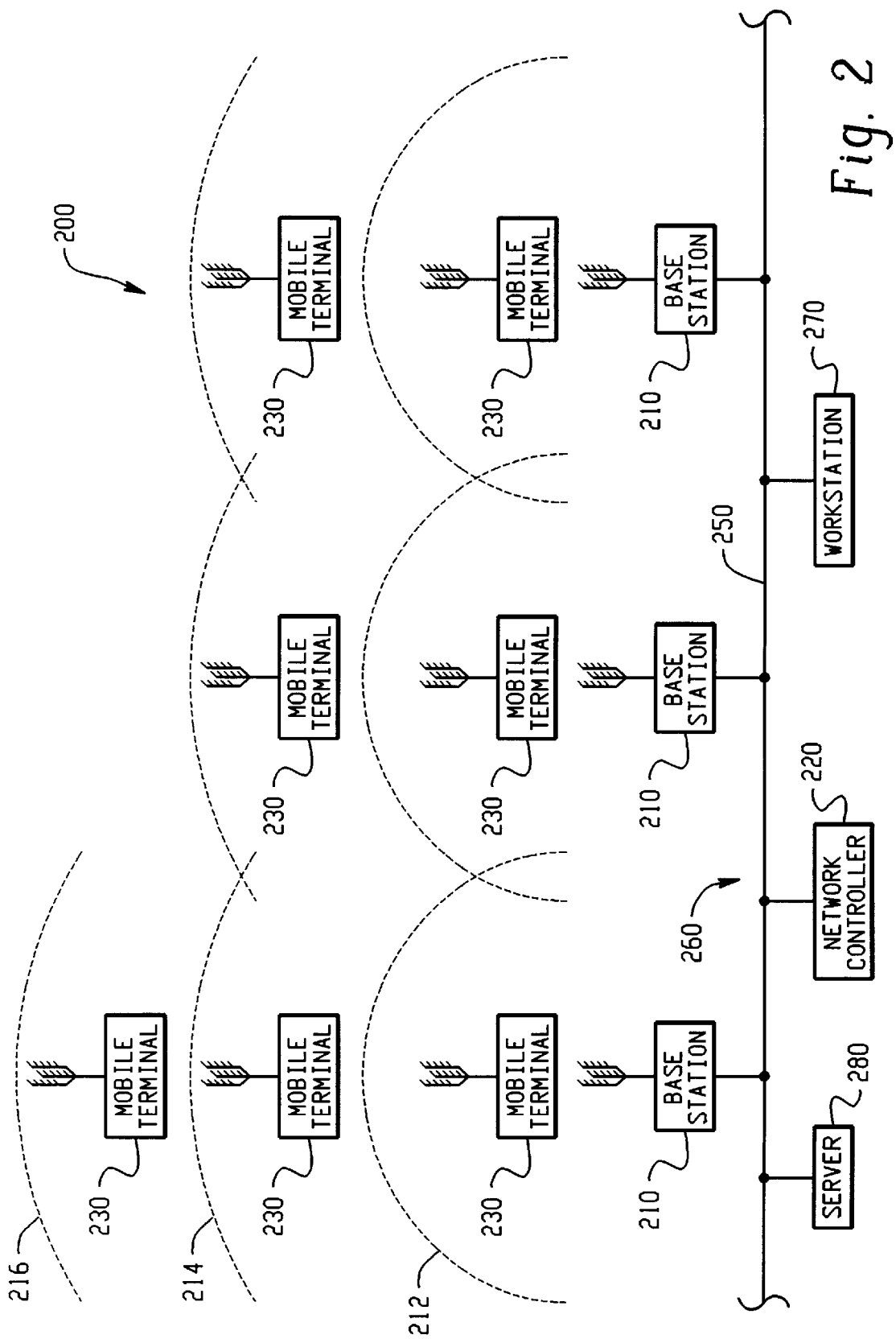
FIG. 2 is a schematic representation of a cellular communication system of the present invention.

FIG. 2 schematically illustrates a cellular communication system, shown generally at 200, of the present invention. The cellular communication system 200 may be one of several types including a local area network (LAN) or a wide area network (WAN).

The cellular communication system 200 includes one or more base stations 210 and a plurality of mobile terminals 230. Each base station 210 has the ability to transmit and receive data within a respective geographic cell. As will be explained below, the system 200 of the present invention permits a base station to effectively adjust its cell size as necessary to permit data transmission with a mobile terminal depending on the distance between the mobile terminal and the base station. The adjustability of the cell size of each base station 210 is schematically illustrated by dashed lines labeled 212, 214, 216 (corresponding to small, intermediate and large cell size).

The base stations 210 interconnected by a hardwired data communication path 250, such as twisted pair cable, shielded coaxial cable or fiber optic lines to form a system backbone 260. However, it should be appreciated that other methods (such as the use of wireless repeaters) could be used to allow the base stations 210 to communicate with one another.

Other components of the system 200 that may be wired to the backbone 260 include a client/server network composed of a work station (client) 270, such as an IBM compatible personal computer, and a server 280, such as an IBM RS/6000. A network controller 220 may also be wired to the backbone 260 to control the flow of data between the base stations 210 and other components wired to the backbone 260. The network controller 220 may communicate with the component wired to the backbone 260 using a variety of protocols, such as the Ethernet protocol and the Token Ring protocol.

The cellular communication system 200 also includes one or more mobile terminals 230 operating in accordance with the present invention and roaming from cell to cell using a registration and deregistration process to assure a single entry point to the backbone 260. The mobile terminals 230 may include a hand held unit or portable unit mounted to a vehicle.

Transmissions preferably occur in packet format 300 (FIG. 3) using Direct Sequence Spread Spectrum (DSSS) wireless communication techniques, as described in the Background section. The mobile terminals 230 and the base stations 210 are capable of varying a PN code length and a chipping rate used for a data transmission.

As indicated previously a longer PN code length results in a higher processing gain and correspondingly increases a communication range between a mobile terminal 230 and a base station 210. On one hand, a high processing gain may advantageously be utilized to permit data transmission between the mobile terminal 230 and the base station 210 that would otherwise be out of the communication range. However, the increased communication range afforded by the high processing gain results in a reduced data transmission rate (where the data transmission rate is measured in terms of original data bits transmitted per unit time).

On the other hand, a lower processing gain may be utilized to achieve a faster data transmission rate between a mobile terminal 230 and a base station 210 which are nearby. The lower processing gain, however, reduces the communication range between the mobile terminal 230 and the base station 210. The chipping rate refers to the rate at which chips are transmitted by the system component sending a data transmission. A system component receiving the data transmission must receive, demodulate and despread the PN coded chip sequence at the chipping rate utilized by the sending component. At a higher chipping rate, the receiver system is allotted a smaller amount of time to receive, demodulate and despread the chip sequence. As the chipping rate increases so to will the error rate. Thus, a higher chipping rate effectively reduces the communication range. Conversely, decreasing the chipping rate increases the communication range.

While the rate/range tradeoff still applies to each individual transmission, the system 200 allows an individual mobile terminal 230 and an individual base station 210 to optimize the processing gain and data transmission rate tradeoff for a given data transmission. This overcomes the cell size/throughput tradeoff limitation. It should be apparent that the system 200, by providing the base stations 210 and the mobile terminals 230 with the ability to dynamically modify the PN code length and the chipping rate, effectively provides a base station 210 with a adjustable cell size. The adjustable cell size for the base stations 210 is schematically illustrated in FIG. 2 by the dashed lines labeled 212, 214, 216. The cell size indicated by the dashed line 212 would correspond to a data transmission characterized by a low processing gain and a high data transmission rate. The cell size indicated by the dashed line 214 would correspond to a data transmission characterized by an intermediate processing gain and intermediate data transmission rate. Finally, the cell size indicated by the dashed line 216 would correspond to a data transmission characterized by a high processing gain and a low data transmission rate. The present system 200 can have exceptionally large cells while only sacrificing throughput to the extent mobile terminals on the fringe of respective base station cells require the higher processing gain for error free communication.

Optimization of a wireless communication link occurs when all parameters are set such that data is transmitted at the fastest possible rate at or below an "acceptable" error rate given the capabilities of the communicating system components, the range of data transmission and the ambient noise conditions. However, in obtaining this optimum setting, tradeoffs will occur as discussed above.

One advantage of dynamically altering the communication parameters to optimize performance is that mobile terminals 230 close to a base station 210 may transmit data rapidly thereby reducing total air time usage. Additionally, fewer base stations will likely be needed to cover a given service region, thereby reducing the overall cost associated with the cellular communication system. Without the ability to dynamically alter communication parameters, the base station cell sizes remain constant. Thus, it will be necessary to ensure that there are a sufficient number of base stations located so as to cover the entire service region. It should be evident in such situations that, unless each base station is preset to transmit at its lowest possible data communication rate, the base station cell size will be less than a cell size defined by its maximum range capabilities. However, given the rate/range tradeoff (as discussed above) it would be extremely inefficient air time usage to set the slowest rate on most base stations and, therefore, a larger number of base stations will be needed to cover any given area. Additionally, by having this dynamic altering ability, base stations may be able to adjust for additional noise introduced into their communicating area. Without this ability, newly introduced noise could result in reduced range or "dead spots" where a mobile terminal can no longer communicate with any pre-existing base station.

While chipping at a constant rate, a relatively short code length (e.g., 10 chips) may be used to transmit data at a relatively fast rate, while a longer code length (e.g., 20 chips) may be used to increase the range at a reduced data transmission rate. A longer transmission range can also be accomplished by using a BPSK modulation complexity over a QPSK modulation complexity since BPSK modulation has a higher tolerance to noise. Also, for a constant code length, a relatively fast PN code chipping rate (e.g., 22 MHz) may be used to transmit data at a relatively fast rate, while a slow chipping rate (e.g., 11 MHz) may be used to reduce the spectral bandwidth at a reduced transmission rate.

In addition to modifying the PN code length and chipping rate, the modulation complexity may be varied. A BPSK modulation scheme, which provides for modulating the carrier to one of two phases, may be used to transmit one bit at a time over the wireless communication link, while a QPSK modulation scheme, which provides for modulating the carrier to one of four phases may be used to transmit data at a faster rate, two bits at a time, over the link. While QPSK will result in a faster data rate, more errors may occur because the receiver must operate within a 90 degree phase decision angle rather than 180 degrees associated with BPSK. Thus, the BPSK modulation scheme provides a 3 db SNR improvement.

Figure 2A:
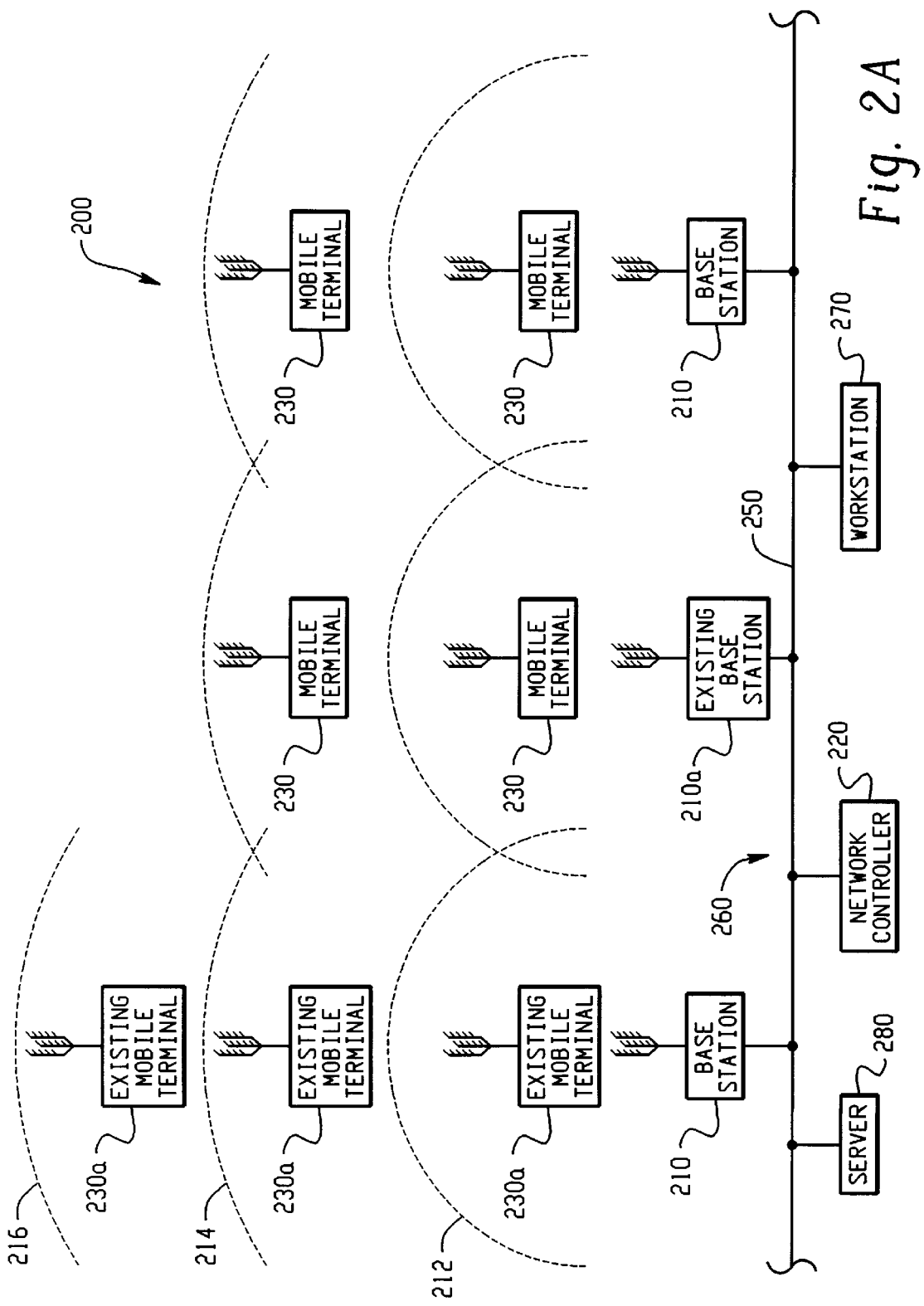
FIG. 2A is a schematic representation of the cellular communication system of FIG. 2 incorporating existing base stations and existing mobile terminals.

FIG. 2A shows a specific embodiment of the cellular communication system 200 of the present invention incorporating an existing base station 210a and three existing mobile stations 230a. This illustrates that the cellular communication system 200 of the present invention is fully compatible with the existing base station 210a and the existing mobile terminals 230a. Further, the present invention facilitates the updating of existing communication systems because the system 200 allows existing base stations and mobile terminals to coexist in the same network with the improved base stations 210 and mobile terminals 230 of the system 200 during a transition period.

The system 200 incorporates the base station 210 and mobile terminal 230 of the present invention and existing mobile terminals 230a which do not alter communication parameters. Each base station 210 is capable of communicating with a plurality of mobile terminals 230 at three different data rates, fast, mid and slow. Because of the rate/range tradeoff, the fast rate can only be used to communicate with mobile terminals 230 located relatively close to a base station 210, that is, within the cell labeled 212. The cell 212 in which the fast rate can be used is referred to as the near zone. The mid data rate can be used to communicate with mobile terminals 230 which are more distant from the base station 210, that is, within the cell labeled 214. In cell 214, the mid data rate can be used, but not the fast data rate. Finally, a mobile terminal 230 that is even more distant from a base station 210 requires data transmission at the slow data rate, that is, a mobile terminal located within the cell labeled 216 requires a slow data transmission rate.

In this particular embodiment, the fast data rate includes use of an 11 chip PN code and a QPSK modulation complexity. The chipping rate can be set to 11 MHz to provide a 2 MB/sec data rate. The mid data rate includes use of an 11 chip code and a BPSK modulation complexity. An 11 MHz chipping rate will provide a 1 MB/sec data rate. The slow data rate includes a 22 chip code and a BPSK modulation complexity. The 11 MHz chipping rate provides a ½ MB/sec data rate.

To eliminate the need for each system component (mobile terminal 230 or base station 210) to have a receiver system capable of simultaneously listening for data transmitted at all three data rates, a network protocol provides for a more simplified receiver system.

The preferred network protocol incorporates a combination of positive and negative acknowledgment signals used by a responding component. The acknowledgment signals provides information to the transmitting component that allows the transmitting component to change its parameters in a manner which optimizes the communication link. A positive acknowledgment signal is returned to the transmitting component when the receiving component properly received all of the transmitted data. Thus, a positive acknowledgment signal informs the transmitting component that its current transmitting parameter settings are sufficient to allow for communication. However, based on the information given in the acknowledgment, more optimal settings may be available. A negative acknowledgment signal is used when the receiving component only partially received the transmitted data. A negative acknowledgment signal informs the transmitting component that its current transmitting parameter settings are not sufficient to allow for proper communication. However, the transmitting component can use the information given in this acknowledgment signal to change its parameters (if possible) to allow for complete and optimal communication to take place.

In the preferred embodiment of this system 200 it is desirable to enable the mobile terminal 230 to choose the data rate or data rates used for the packet. The base station response packet uses the same rate or rates. Therefore, the mobile terminal receiver system will be able to anticipate the rate of the incoming signals at any one time.

The base station, on the other hand, will not know which data rate the mobile terminal 230 will choose, or which of several mobile terminals will transmit a packet. Therefore, the base station would be required to simultaneously listen for all three data rates. To provide for a more simplified base station receiver system, the network protocol requires all packets begin with a header 310 (FIG. 3) transmitted at the mid or slow data rate. Therefore, the base station 210 need only listen for the mid or slow rates.

Figure 3:
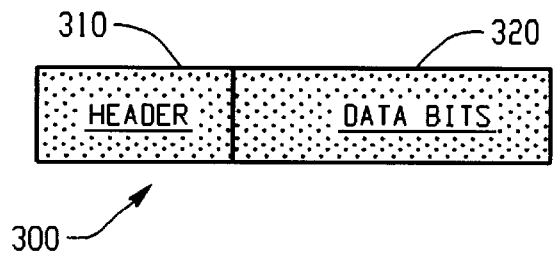
FIG. 3 is a schematic representation of a data packet including a header portion and a data portion.

Referring to FIG. 3, each packet 300 preferably includes overhead bits in the form of a header 310 and a plurality of data bits 320. While the entire packet 300 may be transmitted at the fast, mid or slow rate, the protocol of this specific embodiment provides for the header to be transferred at the mid or slow rate while the data portion is transferred at the fast, mid or slow rates. Any combination of these varying rates in a single packet may be referred to as a packet rate. The header 310 may include receiver system set up data signifying the data rate at which the data bits 320 will be transmitted. The packet 300 may contain synchronization bits between the header and data portion to provide the receiver time to reconfigure to the data transmission rate for the data bits 320.

An existing mobile terminal 230a which cannot change its parameters need only be configured to operate at the mid rates by preselecting its one non-adjustable PN chip code length characteristic value to 11 chips and its modulation complexity to BPSK. Accordingly, the header and data of a packet 300 are always transmitted by existing mobile terminal 230A to the base station at the mid data rates.

Because the mobile terminals 230 may transmit headers 310 of the packets 300 to the base station 210 at either the mid rate or the slow rate the modulation complexity of the header is always BPSK. Therefore, the base station receiver system is configured to receive BPSK signals, in that it distinguishes between the two possible phases of the carrier frequency. However, the mid data rate has an 11 chip PN code and the slow data rate has a 22 chip PN code, therefore, the base station 210 must be able to determine which of the two PN codes is in use to determine whether the header 310 is being transmitted at the mid or slow data rates. Therefore the base station 210 includes two correlation channels, one to correlate when an 11 chip PN code length is used and the second correlation channel configured to communicate using a 22 chip PN code length. In response to a header 310 indicating that the accompanying data bits 320 of the packet 300 are to be communicated using the fast data rate, the base station 210 reconfigures to receive QPSK modulation and the incoming data is correlated with an 11 chip PN code.

It should be readily understood that there can be several embodiments of the mobile terminal 230 of the present invention. Different embodiments may have different limitations on the parameters used to vary the processing gain. For example, a first embodiment may be capable of varying PN code length and modulation complexity in accordance with all three data rates. In another more limited embodiment, the mobile terminal 230 may be capable of varying the modulation complexity but not the chip PN code length. When such embodiment is set for an 11 chip PN code, it is capable of the fast and mid data rates.

The network of this invention can also support existing base stations 210a and base stations 210 with limited ability to alter code length or modulation complexity. The capabilities of both the mobile terminal 230 and the base station 210 limit the data rates that the mobile terminal 230 can choose. The base station may include its rate capabilities in the "OK to register" packet and the mobile terminal 230 will comply with the base station's rate limitations when choosing a data rate.

In summary, the preferred embodiment of the cellular communication system 200 of the present invention utilizes a packet structure with a mid or slow data rate used for the header 310 and a fast, mid or slow data transmission rate used for the data bit portion 320 of the packet 310. The mobile terminal 230 chooses the packet data transmission rates and the base station response packet will use the same rates.

Figure 4:
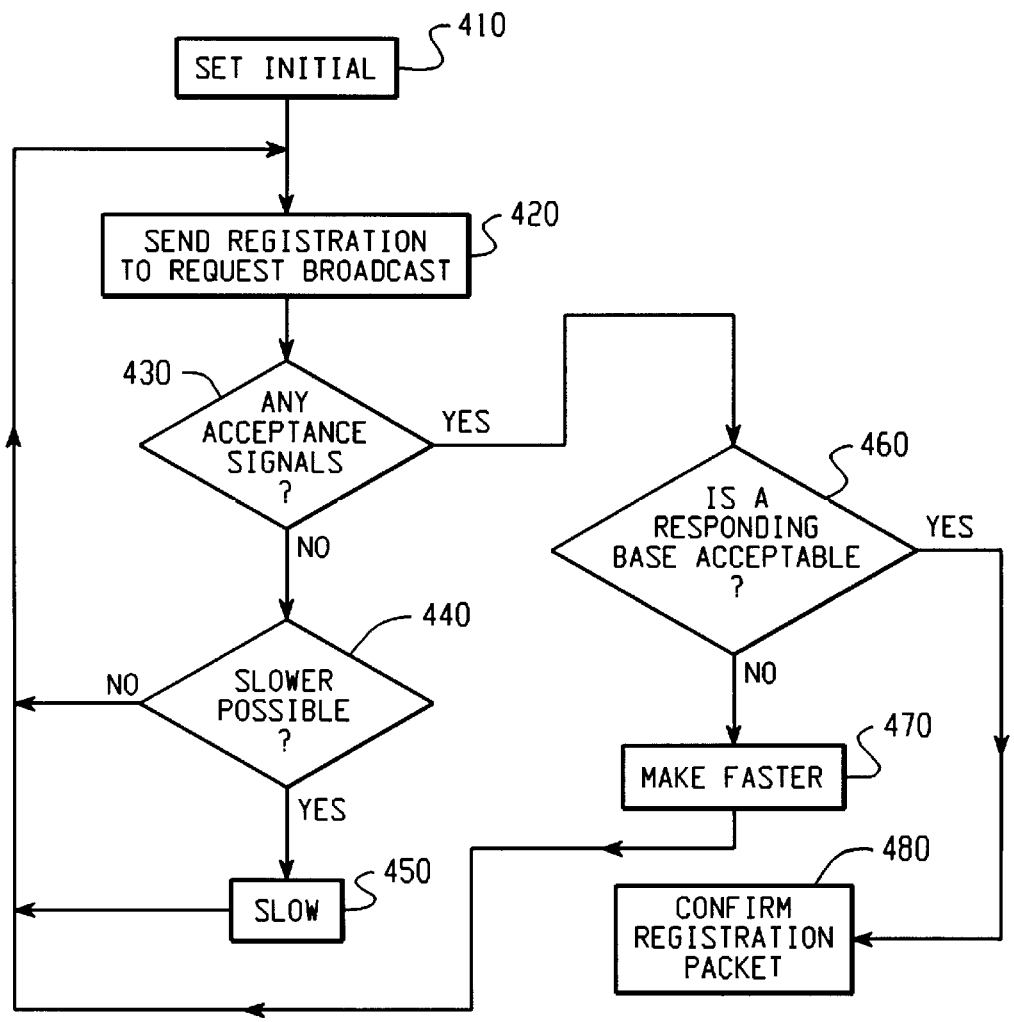
FIG. 4 is a flowchart illustrating a mobile terminal registering with and ascertaining a data communications rate for communicating with a base station.

FIG. 4 is a flowchart that represents the process by which a mobile terminal 230 registers with a base station 210 and selects an initial data rate to be used for communicating with the base station. At step 410, the mobile terminal 230 sets its initial rate at which it will attempt to register with one of the base stations. The initial rate set may simply default to a fast rate or be set in accordance with the rate at which previous communications have occurred or be set by any other criteria including a transmission rate known to be within the capability of certain base stations. At step 420, the mobile terminal 230 sends a request to register signal at the preset data rate. The mobile terminal 230 then proceeds to step 430 where it waits for a preset period of time and determines whether an acceptable "OK to register" signal has been received from at least one base station 210. In no acceptance signal is received then the mobile terminal 230 proceeds to step 440.

At step 440, it is determined whether the particular embodiment of the mobile terminal 230 in use has the capability of communication at a slower rate. If it is possible, then at step 450 data transmission rate parameters within the mobile terminal 230 are changed to slow the data transmission rate, thereby increasing the signal range, and proceeds back to step 420 and attempts to register with a base station 210 at the slower transmission rate. If it is not possible to slow the communication rate, then the mobile terminal proceeds back to step 420 where it retransmits its "request to register".

If, at step 430, the mobile terminal 230 receives an acceptance to register signal, then the terminal proceeds to step 460. At step 460 the mobile terminal 230 determines if the responding base station 210 is acceptable. In this particular embodiment, there are three instances when the responding base station 210 would be acceptable: (1) when the request to register signal was sent at the fastest rate, (2) when the request to register was not sent at the fastest rate, however, there was no acceptance at an already attempted faster rate, or (3) when only one base station responds. If any one of these preceding conditions exist, the mobile terminal will proceed to step 480 where it will register with a first base station 210 meeting one of the conditions when the conditions are taken in numerical order.

If the responding base station 210 is not acceptable, then the mobile terminal 230 will proceed to step 470 where the mobile terminal parameters are modified to send the "request to register" at a faster rate and then proceeds back to step 420 where it attempts to register at the faster rate. The purpose of the step 420 is to help optimize the system by ensuring that the base station with the strongest signal is being used.

Figure 5:
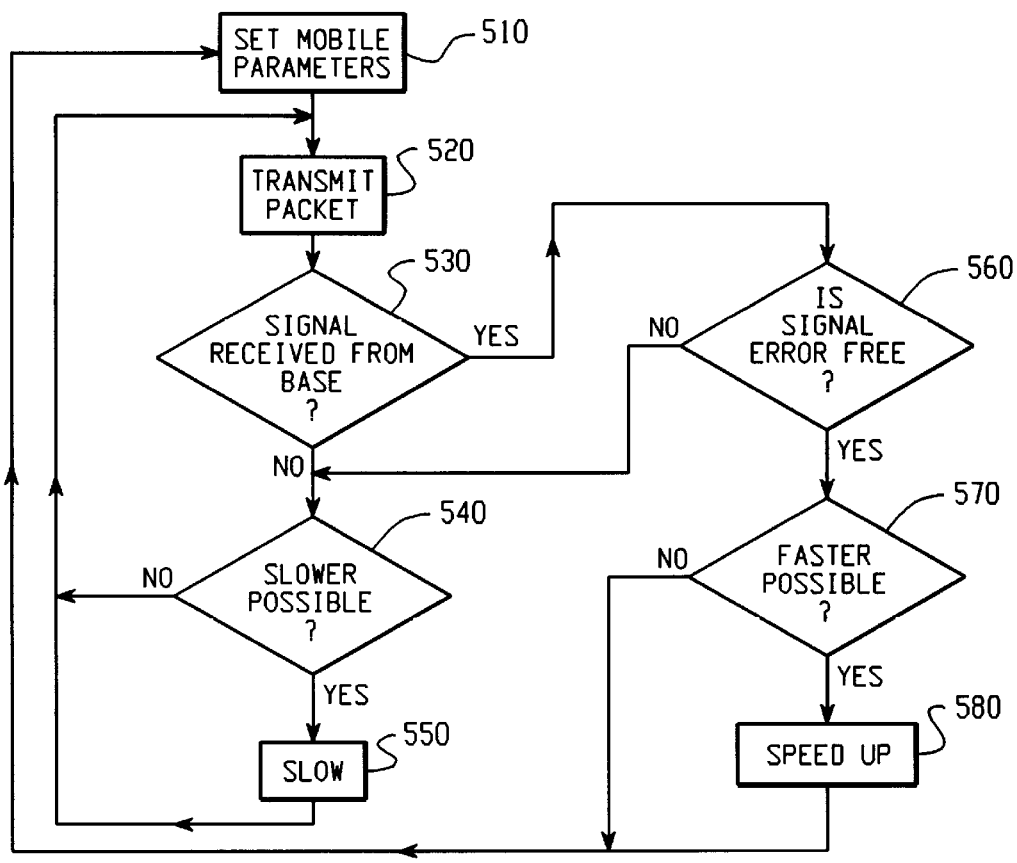
FIG. 5 is a block diagram illustrating a mobile terminal setting communication parameters to correspond to a selected data communications rate with a base station.

Once the mobile terminal 230 is registered and an initial data rate is set, all communication between the base station 210 and the mobile terminal 230 may take place at that data rate. Periodically, the mobile terminal 230 may attempt to re-register at a faster data rate. Alternatively, the mobile terminal may vary the communication rate while already registered. FIG. 5 is a flowchart which represents this process. Step 510 represents the mobile terminal setting the communication parameters to correspond to the data rate at which it will attempt communication with the base station 210. The initial setting may be a default rate, a rate previously used, a rate at which the mobile terminal 230 has recently intercepted a transmission from the base station, or a rate set by some other criteria. At step 520, the mobile terminal 230 transmits at the rate set. At step 530, the mobile terminal 230 then waits to receive a response signal from the base station 210. The base station 210 will send the response signal at the same data rate or rates used by the mobile terminal 230. If no response signal is received by the mobile terminal 230, it can be concluded that the base station 210 did not receive the transmission, or the transmission was not received error free. Therefore the mobile terminal 230 attempts to increase the range and accuracy by using a slower data rate. Step 540 represents the mobile terminal determining whether a slower rate is possible. If the determination results in a positive answer, the mobile terminal 230 varies communication parameters to slow the rate at step 550 and retransmits at step 520. If a slower rate is not possible, the mobile terminal 230 simply returns to step 520 to attempt another transmission. To avoid an endless loop at the slowest data rate, the mobile terminal 230 may attempt to register with another base station (as discussed earlier) when communication is no longer possible with the present base station 210.

If, at step 530, a response signal is received within a preset period of time, then the mobile terminal 230 proceeds to step 560. At step 560, the mobile terminal 230 determines whether the response signal was received error free. If not, then the mobile terminal progresses to step 540 where it determines if a slower data rate is possible. However, if the response signal is received error free, then the mobile terminal proceeds to step 570 where it determines whether a faster communication rate with the base station 210 is possible. If it is possible, then at step 580 one or more communication parameters within the mobile terminal 230 are changed to increase the communication rate with the base station. The new parameters are set at step 510 for use when transmitting the next packet. If, however, at step 570, it is not possible to increase the communication rate between the mobile terminal and the base station, then the mobile terminal will simply keep the currently set communication parameters at step 510.

Figure 6:
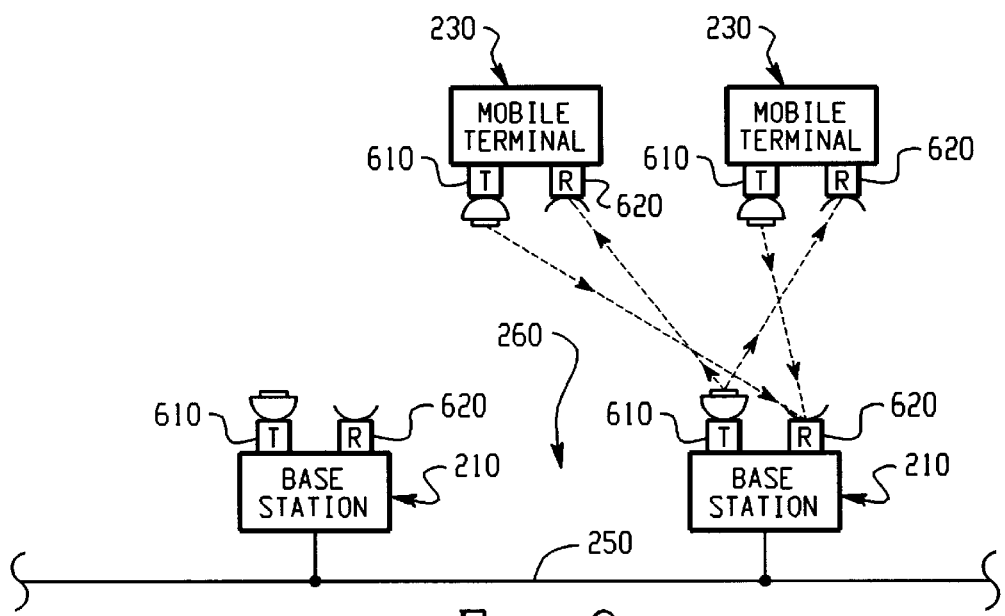
FIG. 6 is a schematic representation of a portion of a cellular communication system of the present invention.

Referring to FIG. 6, in a cellular communication system of the present invention, a mobile terminal 230 communicates with a base station 210 via its respective transmitter system 610 and receiver system 620. Generally, as described above, the transmitter system 610 and the receiver system 620 of the base station 210 and mobile terminal 230 will adjust their parameters in order to optimize the system 200. Thus, the following sections describe in detail a variety of embodiments which the transmitter system 610 and receiver system 620 may use in adjusting these data rates.

The transmitter system 610 of the present invention may be implemented in a number of embodiments. For example, referring to FIGS. 7A, 7B, and 7C, these embodiments may include two or more non-controllable transmitters 710a, a controllable transmitter 710b, and a combination of a non-controllable transmitter 710a and a controllable transmitter 710a. A non-controllable transmitter 710a, as shown in FIG. 7D and described in further detail below, is a transmitter which is typically used in existing base stations 210a and existing mobile terminals 230a because it is capable of transmitting PN coded signals formed with PN codes having only one preselected, nonadjustable value of each characteristic. On the other hand, a controllable transmitter 710b, as shown in FIG. 7E and described in more detail below, is a transmitter capable of transmitting PN coded signals formed with PN codes having a plurality of adjustable values for one or more modulation characteristics.

Figure 7A:
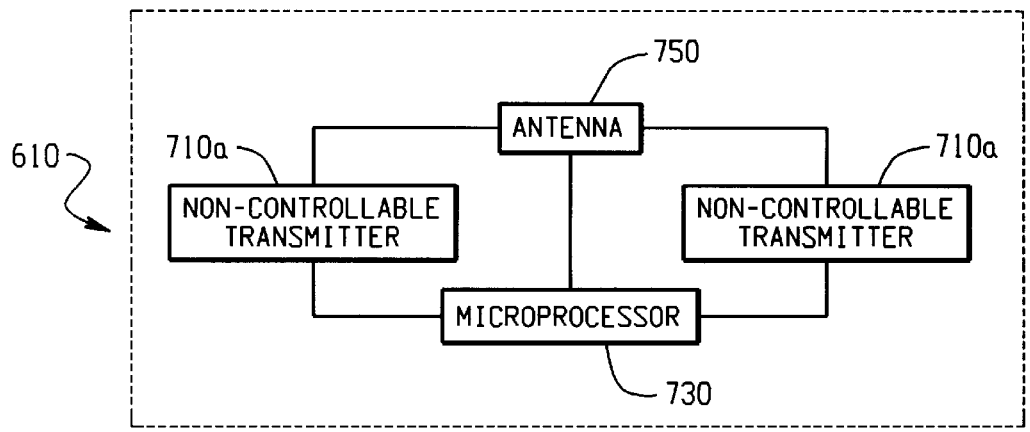
FIG. 7A is a block diagram of one embodiment of a transmitter system of the present invention.

FIG. 7A illustrates one of the embodiments of the transmitter system 610. For this embodiment, the transmitter system 610 includes a plurality of non-controllable transmitters 710a, a microprocessor 730 and an antenna 750. Each non-controllable transmitter 710a is capable of transmitting at a packet rate that is different than the values selected for each of the other non-controllable transmitters 710a. As is discussed above, the header portion 310 and the data portion 320 of the packet 300 may be sent at different data transmission rates and, therefore, each packet rate represents a different combination of these possibilities. Once a packet rate has been determined (via the processes described with reference to FIGS. 4 and 5), a microprocessor 730 will prepare for transmission by selecting the non-controllable transmitter 710a capable of transmitting at this rate.

Figure 7B:
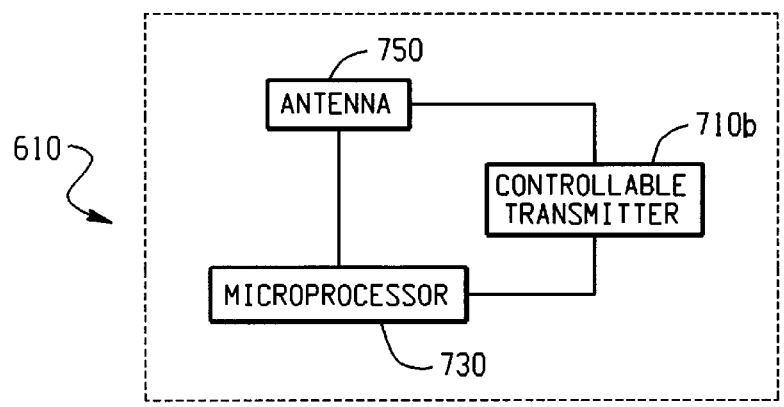
FIG. 7B is a block diagram of another embodiment of a transmitter system of the present invention.

FIG. 7B illustrates another embodiment of the transmitter system 610. This embodiment is very similar to the transmitter system 610 shown in FIG. 7A. However, this transmitter system 610 includes a controllable transmitter 710b, as opposed to a plurality of non-controllable transmitters 710a. Thus, in preparing for transmission, the microprocessor 730 will simply make adjustments to the controllable transmitter 710b such that it is capable of transmitting at the given packet rate.

Figure 7C:
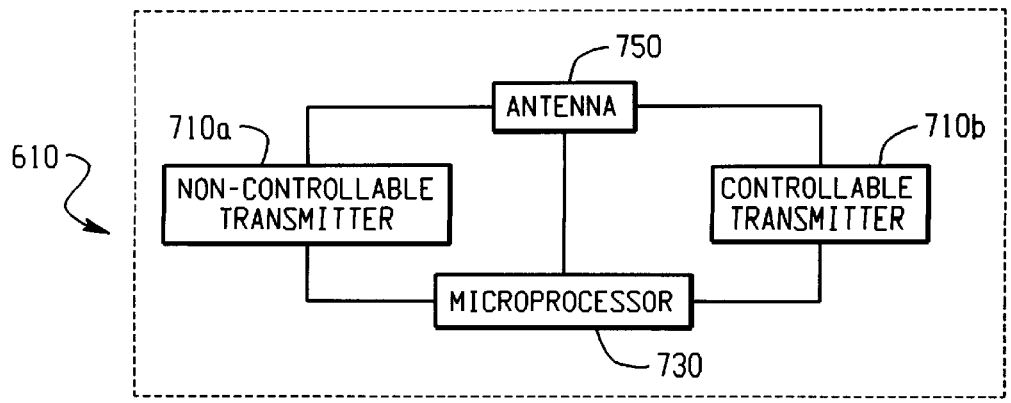
FIG. 7C is a block diagram of another embodiment of a transmitter system of the present invention.
Figure 7D:
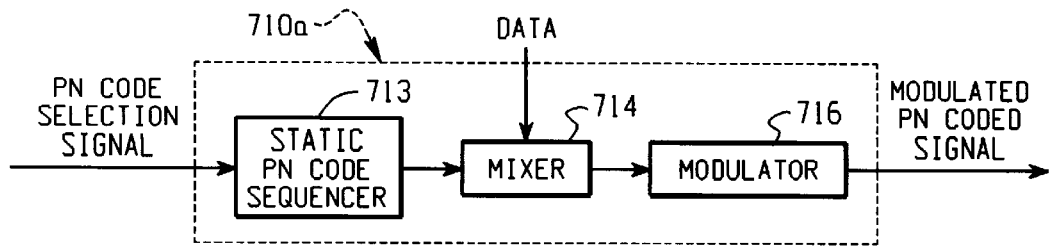
FIG. 7D is a block diagram of a non-controllable transmitter of the present invention.
Figure 7E:
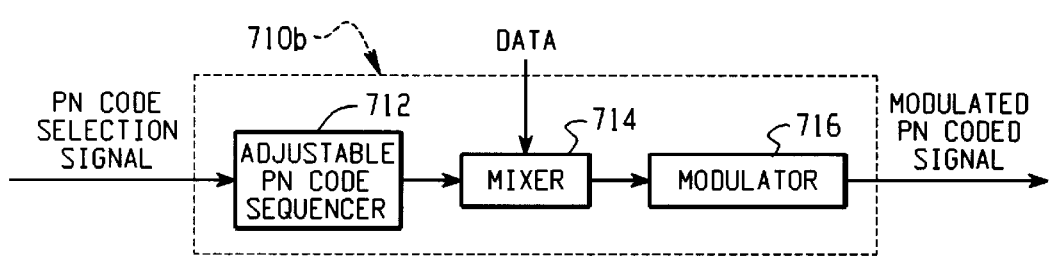
FIG. 7E is a block diagram of a controllable transmitter of the present invention.

FIG. 7C illustrates yet another embodiment of the transmitter system 610. This embodiment is also very similar to the transmitter systems 610 illustrated above in FIGS. 7A and 7B. However, this transmitter system 610 includes a non-controllable transmitter 710a and a controllable transmitter 710b. In preparing for transmission, the microprocessor 730 will first look to see if any non-controllable transmitter 710a is capable of sending at the given packet rate and, if so, the microprocessor 730 selects this transmitter. However, if no such non-controllable transmitter exists, then the microprocessor 730 will simply adjust the controllable transmitter 710b to send at the given packet rate.

Following the selection or adjustment of the proper transmitter in any of the embodiments shown above (7A, 7B, 7C), the microprocessor 730 may also adjust other communication parameters (i.e. antenna type, signal power, etc.) prior to transmission. Once all of these additional characteristics are adjusted for, the transmitter selected prepares to transmit according to the parameters set.

FIGS. 7D and 7E, are block diagrams of the non-controllable transmitter 710a and the controllable transmitter 710b. Referring to FIG. 7D, the non-controllable transmitter 710a generally includes a static PN code sequencer 713, a mixer 714 and a modulator 716. The mixer 714 receives the data to be transmitted and mixes the data with a PN code received from the static PN code sequencer 713, which is a PN code sequencer capable of sequencing a PN code having only constant parameters (i.e. chip code length, chipping rate . . . etc.). The mixer 714 then mixes the data with the PN code to form the PN coded signal and forwards the PN coded signal to the modulator 716. The modulator 716 then modulates the PN coded signal onto a carrier frequency with, for example, a BPSK or QPSK modulation complexity type.

Referring to FIG. 7E, the controllable transmitter 710b generally includes an adjustable PN code sequencer 712, a mixer 714 and a modulator 716. In operation, the adjustable PN code sequencer 712, which is a PN code sequencer capable of adjusting a PN code to a variety of parameters, receives a signal from the microprocessor 730 indicating the parameters to be set. This signal is then used to adjust the PN code values of the PN code sequencer 712 accordingly. The PN code sequencer 712 then forwards to the mixer 714 a PN code having the parameters selected. The mixer 714 receives data to be transmitted and mixes the data with the PN code received from the adjustable PN code sequencer 712. The mixer 714 then mixes the data with the PN code to form the PN coded signal and forwards the PN coded signal to the modulator 716. The modulator 716 then modulates the PN coded signal onto a carrier frequency with one of the modulation complexities.

Associated with each transmitter system 610 is a receiver system 620 using the same antenna 750 and microprocessor 730. However, unlike the transmitter systems, a receiver system is required to maintain certain characteristics when housed in a base station 210 which are not necessary for receiver systems housed in mobile terminals. The reason for the difference is that base station receivers, under this embodiment, are initially required to handle packets being sent at either the mid or slow packet rates (i.e. BPSK modulation and either an 11 or 22 chip PN code length, see above). Thus, in order to handle either instance, the base station receiver system must have at least two correlators to account for the different chip code lengths. A mobile terminal 230, on the other hand, initiates the communication with a base station 210 at a specific rate and any responding base station must reply at the same rate. Therefore, the mobile terminal receiver will not have to "guess" as to which rate the base station will respond and only needs one correlator to effectively communicate.

Similar to the transmitter system 610, the receiver system 620 of the present invention may also be implemented in a multitude of embodiments with the only restriction being that receiver systems for base stations must have at least two separate correlators, one of which is capable of handling a slow packet data transmission rate and one of which is capable of handling a mid packet data transmission rate. As described below, each receiver typically has only one correlator associated with it and, therefore, the receiver system 620 must have at least two receivers within it. However, since the initial packet is always sent at the BPSK rate (i.e. mid or slow rates) only one demodulator is needed to handle this initial data. If it is indicated that further data will be sent at the fast packet rate, then a second demodulator capable of handling a QPSK modulation complexity would be necessary.

Figure 8A:
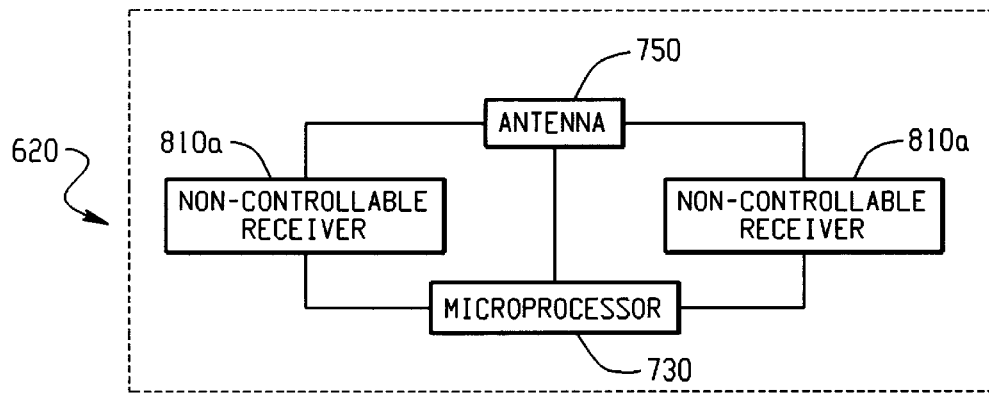
FIG. 8A is a block diagram of one embodiment of a receiver system of the present invention suitable for use within a base station or a mobile terminal.
Figure 8B:
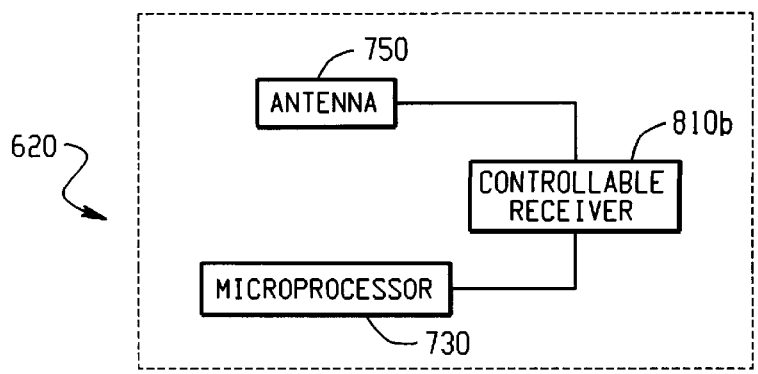
FIG. 8B is a block diagram of another embodiment of a receiver system of the present invention suitable for use within a base station or a mobile terminal.

FIGS. 8A and 8B show typical embodiments of the receiver system 620 of the present invention which may be used within a base station 210 or a mobile terminal 230. For instance, FIG. 8A shows the receiver system 620 with a combination of two or more non-controllable receivers 810a, while FIG. 8B shows the receiver system 620 having a combination of a controllable receiver 810b and a non-controllable receiver 810a. As describe below, non-controllable receivers 810a are ones which do not have the capability of changing their own parameters to receive packets at data communication rates other then the rate preset within the particular non-controllable receiver. The controllable receivers 810b, on the other hand, have at least some capability to vary their receiving parameters to be able to receive packets at more then one data communication rate.

In operation, when only non-controllable receivers 810a are used in the receiver system 620 (see FIG. 8A), the microprocessor 730 will simply select the non-controllable receiver 810a capable of handling the packet to be received. If no such non-controllable receiver 810a exists, then the receiver system 620 would not be capable of receiving this packet. If, however, both a non-controllable receiver 810a and a controllable receiver 810b exist in the same receiver system 620 (see FIG. 8B), then the microprocessor 730 first determines whether the non-controllable receiver 810a is capable of handling the packet to be received. If so, the microprocessor 730 selects this non-controllable receiver 810a. If the non-controllable receiver 810a is not capable of handling the packet, then the microprocessor 730 will simply adjust the controllable receiver 810b such that it is capable of receiving the anticipated packet. Following this selection/adjustment process, the microprocessor 730 may also make adjustments to other parameters which may help the receiving process (i.e., changes to the antenna, battery power, etc.).

Figure 8C:
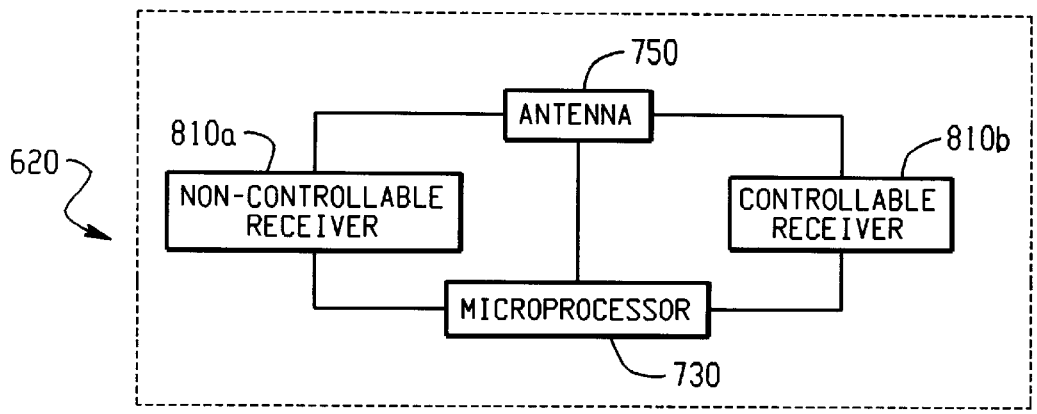
FIG. 8C is a block diagram of another embodiment of a receiver system of the present invention suitable for use within a mobile terminal with one controllable receiver.

As indicated above, since the mobile terminal 230 does not require two correlators, it is possible that only one receiver is used within the mobile terminal. Therefore, FIG. 8C depicts another embodiment which is available for the mobile terminal only. In this embodiment, the receiver system 620 utilizes only one controllable receiver 810b which is continually adjusted by the microprocessor 130 to receive packets at the desired rate.

Figure 8D:
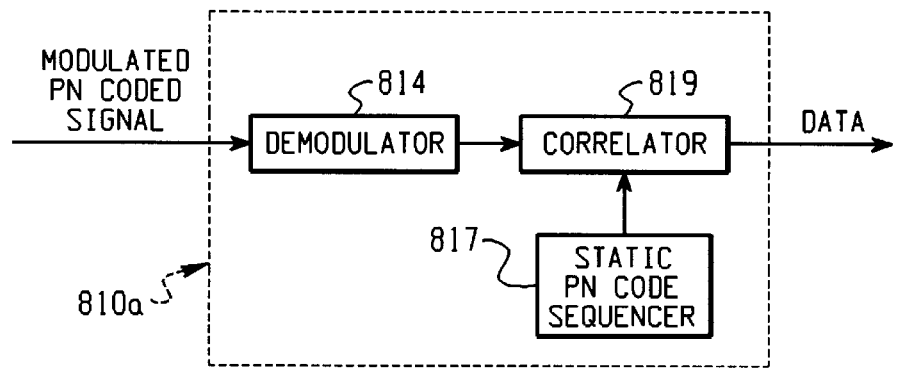
FIG. 8D is a block diagram of a non-controllable receiver of the present invention.
Figure 8E:
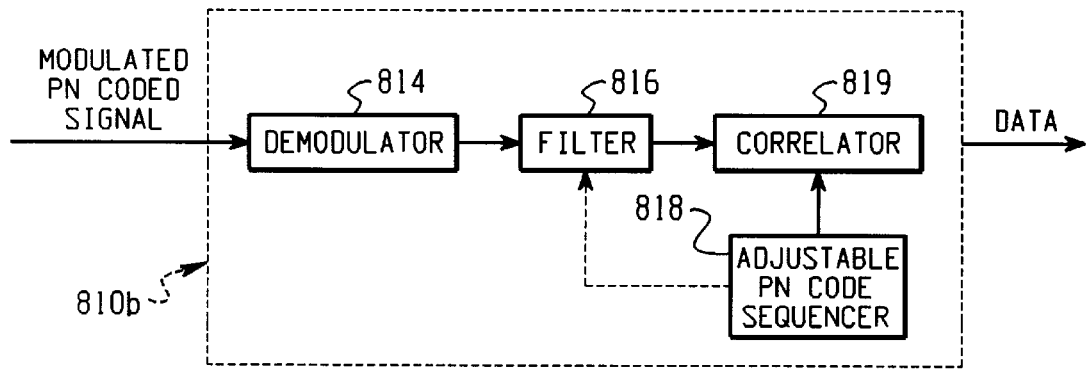
FIG. 8E is a block diagram of a controllable receiver of the present invention.

FIGS. 8D and 8E further describe the non-controllable receiver 810a and the controllable receiver 810b, respectively. Referring to FIG. 8D, the non-controllable receiver 810a generally includes a demodulator 814, a static PN code sequencer 817 and a correlator 819. In operation, the particular non-controllable receiver 810a has been selected by the microprocessor 730 because of its capability of receiving a packet having certain values which correspond to those values transmitted from a transmitter system 610.

The demodulator 814 receives the modulated PN coded signal from the transmitter system 610. The demodulator 814 demodulates the PN coded signal from the carrier frequency and forwards the PN coded signal to the correlator 819. The correlator 819 also receives a PN code received from the static PN code sequencer 817, which is a PN code sequencer capable of sequencing a PN code having only constant values. The correlator 819 then uses the PN code to correlate the data (extract or decode the data) from the PN coded signal.

Referring to FIG. 8E, as described above, the receiver system 620 may also include a controllable receiver 810b which may be used instead of or in conjunction with the non-controllable receivers 810a. The controllable receiver 810b is similar to the non-controllable receiver 810a but is additionally capable of receiving PN coded signals formed with PN codes having different values.

The controllable receiver 810b includes a demodulator 814, a filter (preferably a baseband filter) 816, an adjustable PN code sequencer 818 and a correlator 819. In operation, the demodulator 814 receivers the modulated PN coded signal from the transmitter system 610. The demodulator 814 demodulates the PN coded signal from the carrier frequency and forwards the PN coded signal to the filter 816. Prior to receiving the PN coded signal, the filter 816 receives the PN code chipping rate value signal from the microprocessor 730 and adjusts its spectral bandwidth based on the PN code chipping rate value received. Upon receipt of the PN coded signal, the filter 816 then filters the PN coded signal and forwards the filtered PN coded signal to the correlator 819. Additionally, the adjustable PN code sequencer 818 may also be feed through the filter 816 prior to entering the correlator 819.

Prior to receiving the filtered PN coded signal, the correlator 819 receives a PN code length signal form the microprocessor 730 and adjusts itself accordingly to correlate a PN code having the PN chip code length value. In another embodiment, the correlator 819 is actually a plurality of correlators 819 and the microprocessor 730 selects the correlator 819 capable of correlating a PN code having the selected PN code length value.

Upon receipt of the PN coded signal, the correlator 819 also receives a PN code from the adjustable PN code sequencer 818, which is a PN code sequencer capable of adjusting a PN code to a variety of values received form the microprocessor 730. The correlator 819 then uses the PN code to correlate (decode) the data from the PN coded signal.

Another embodiment of the cellular communication system 200 of the present invention includes a mobile terminal 230 and/or base station 210 that can vary its transmitting parameters but not its receiving parameters. Conversely, such a system 200 may have a mobile terminal 230 and/or a base station 210 that can vary only its receiving parameters but not its transmitting parameters.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible.

We claim:

1. A cellular communication system comprising:
   (a) a plurality of base stations, each of said base stations having a receiver configured to receive packets of data, each of said packets of data having at least two sets of data bits, wherein data bits in a first set of said at least two sets of data bits are represented by a first PN code, and data bits of a second set of said at least two sets of data bits are represented by a second PN code, a length of the first PN code being different from a length of the second PN code and wherein the length of the second PN code is selected from among a plurality of different PN code lengths so as to obtain a predetermined communication rate of said second set of data bits;
   (b) a networking system providing a communication medium between each of said base stations; and
   (c) a plurality of mobile terminals, each of said mobile terminals transmitting said data packets having the first set and the second set of said at least two sets of data bits.

2. The cellular communication system of claim 1, wherein said networking system is a wired local area network having a cable medium.

3. The cellular communication system of claim 1, wherein said first and second PN codes are selected from a group consisting of a PN code having 11 chips, a PN code having 22 chips, a PN code having 33 chips and a PN code having 44 chips.

4. The cellular communication system of claim 1, wherein said packets of data transmitted are transmitted at a single carrier frequency at any given time.

5. A cellular communication system comprising:
   (a) a plurality of base stations, each of said base stations having a receiver configured to receive packets of data, each of said packets of data having at least two sets of data bits, wherein data bits in a first set of said at least two sets of data bits are represented by a first PN code and a first modulation complexity, and data bits of a second set of said at least two sets of data bits are represented by a second PN code and a second modulation complexity, with at least one of the first PN code being different from the second PN code and the first modulation complexity being different from the second modulation complexity and wherein at least one of the second PN code and the second modulation complexity is selected from among a plurality of different PN codes and a plurality of different modulation complexities so as to obtain a predetermined communication rate of said second set of data bits;
   (b) a networking system providing a communication medium between each of said base stations; and
   (c) a plurality of mobile terminals, each of said mobile terminals transmitting said data packets having the first set and the second set of the at least two sets of data bits.

6. The cellular communication system of claim 5, wherein said networking system is a wired local area network having a cable medium.

7. The cellular communication system of claim 5, wherein said first and second PN codes are selected from a group consisting of a PN code having 11 chips, a PN code having 22 chips, a PN code having 33 chips and a PN code having 44 chips.

8. The cellular communication system of claim 5, wherein said first and second modulation complexities is selected from the group consisting of: BPSK, QPSK, 16 QAM and 32 QAM.

9. The cellular communication system of claim 5, wherein said packets of data transmitted are transmitted at a single carrier frequency at any given time.

10. A cellular communication system comprising:
    (a) a plurality of base stations, each of said base stations having a receiver configured to receive packets of data, each of said packets of data having at least two sets of data bits, wherein data bits in a first set of said at least two sets of data bits have been transmitted at a first data rate, and data bits of a second set of said at least two sets of data bits have been transmitted at a second data rate, the first data rate being different from the second data rate and wherein the second data rate is selected from among a plurality of different data rates so as to obtain a predetermined communication rate of said second set of data bits;
    (b) a networking system providing a communication medium between each of said base stations; and
    (c) a plurality of mobile terminals, each of said mobile terminals transmitting said data packets having the first set and the second set of said at least two sets of data bits.

11. A cellular communication system comprising:
    (a) a plurality of base stations and a plurality of mobile terminals, each mobile terminal adapted to transmit data packets to and receive data packets from the base stations;
    (b) a networking system providing for communication between each of the base stations;
    (c) a first mobile terminal transmitting a first data packet including a plurality of data bits to a first base station which receives the packet, said data bits being transmitted to the first base station at a first instantaneous data transmission rate; and
    (d) a second mobile terminal transmitting a second data packet including a plurality of data bits to the first base station which receives the packet, said data bits being transmitted to the first base station at a second instantaneous data transmission rate, the second instantaneous data transmission rate being different than the first instantaneous data transmission rate;
    wherein the plurality of data bits in the first data packet are converted by the first mobile terminal to a first sequence of coded chips in accordance with a spreading function utilizing a first PN code, the plurality of data bits in the second data packet are converted by the second mobile terminal to a second sequence of coded chips in accordance with a spreading function utilizing a second PN code, the first PN code having a different code length than a code length of the second PN code.

* * * * *